Dec. 5, 1967   R. D. DRUSHELLA   3,356,535
FLUID DISTRIBUTION MEANS IN A FUEL CELL
Filed Dec. 26, 1962

Inventor
Richard D. Drushella
By Joseph E. Kerwin
Attorney

United States Patent Office 3,356,535
Patented Dec. 5, 1967

3,356,535
FLUID DISTRIBUTION MEANS IN A FUEL CELL
Richard D. Drushelia, Milwaukee, Wis., assignor to Allis-Chalmers Manufacturing Company, Milwaukee, Wis.
Filed Dec. 26, 1962, Ser. No. 247,796
8 Claims. (Cl. 136—86)

This invention relates to fuel cells and fuel cell batteries, particularly to the means for supplying reactive fluids to the electrodes.

A fuel cell produces electrical energy directly from the chemical energy of combustible reactive fluids. Commonly these reactive fluids are known as a fuel fluid and an oxidizing fluid. A fuel cell may be constructed in different ways but one type essentially comprises an oxygen electrode, a fuel electrode, an electrolyte between the electrodes, and chambers adjacent the electrodes for placing the reactive fluid in contact with the electrodes. The chambers are located and the reactive fluids introduced into the fuel cell so that the fuel fluid passes over and into the fuel electrode and the oxidizing fluid passes over and into the oxygen electrode. The electrolyte may be a liquid solution either contained within a chamber or impregnated in a permeable membrane. The electrodes are fluid permeable and the reactive fluids permeate their respective electrodes and therein contact the electrolyte which also permeates into the electrode. A chemical reaction takes place between the reactive fluids and the electrolyte (a catalyst may be present) to produce electrical current that can be used through an external circuit connected between the fuel and oxygen electrodes. In most practical applications, these fuel cells are integrally mounted and connected to form a fuel cell battery or module. The individual cells may be connected in series or parallel combinations to obtain the voltage and current desired.

In one type of fuel cell, for example, a hydrox fuel cell, hydrogen is used as fuel fluid, oxygen as oxidizing fluid, and the electrolyte is a liquid solution of potassium hydroxide. In this type of fuel cell, water is produced as an end product of the chemical reaction at the fuel electrode. This invention is applicable to this or a similar type cell wherein part of the end product produced at the fuel electrode permeates into the electrolyte and is consumed in a chemical reaction at the oxygen electrode, and part remains and accumulates in the fuel electrode. The amount that remains in the fuel electrode must be controlled by eliminating the excess water from the fuel cell for continuous effective operation. This is often accomplished, with varying but limited success, by carrying the surplus water out of the fuel cell with the excess hydrogen that passes into and out of the fuel cell without being consumed. Most of the water remaining in the fuel electrode vaporizes and tends to saturate the hydrogen but part may remain unvaporized and accumulates in the electrode. If the water vaporized becomes excessive it reduces the effectiveness of the cell because the hydrogen is diluted by the water vapor thereby reducing the amount of hydrogen per unit of volume of fluid actually contacting the electrode. Any accumulated unvaporized water reduces the effectiveness because it reduces the available reaction space in the electrode.

The problem of the presence of excess water vapor in the hydrogen is most pronounced in the usual fuel cell that has a chamber with a small inlet and outlet for conducting the fluid to and from the electrode. The flow paths created are irregular and develop dead spots with little replenishment of hydrogen and swirling areas where the hydrogen makes many passes over the electrodes before it is exhausted. These dead spots and swirling areas lessen the amount of surface of the electrode actually contacted by new hydrogen, and there is little tendency to carry out water formed in the electrode because the hydrogen in these areas is already saturated.

Attempts have been made to overcome this problem with baffles and similar devices and the use of wider inlets and outlets. These have been only partially successful. The most successful attempt utilizes a fuel cell with an electrode holder that has recesses or grooves functioning as a fluid distribution means for delivering the reactive fluid to and receiving it from the electrode. This distribution means in the usual embodiment is formed by two separate groups of grooves, distribution grooves and collection grooves, in the electrode holder. These grooves are formed contiguous the electrode by the surface abutting the electrode. Reactive fluid is delivered along an inlet means under pressure to one group called the distribution grooves. The reactive fluid flows through the electrode to the other group of grooves called the collection grooves. An outlet means receives the reactive fluid from the collection grooves and exhausts it from the fuel cell. All the reactive fluids flowing into and out of the fuel cell must pass through the electrode. The stream of reactive fluid flowing through the electrode carries the water, or other end product, out of the electrode and the fuel cell.

Flowing the reactive fluid, particularly the fuel fluid, through the electrode has enabled some control of the amount of end product present, and has therefore increased the effectiveness of this type of fuel cell. Nevertheless, it has been found that even though the accumulation of end product in the fluid is substantially controllable, the fuel fluid picked up some end product as it passed along the groove. This accumulation of end product in the fuel fluid as it flowed toward the far end of the collection groove diluted the fuel fluid and soon the portions of the electrode in contact with the far end of the grooves (away from the inlet means) became saturated with end product. The net result was that those end portions of the electrode contained excessive amounts of end product that diluted the electrolyte beyond desirable limits, and equal control over the entire electrode was difficult, if not impossible. Also, any end product forced out of the far end of the electrode was replaced by the end product carried by the fuel fluid and as a result, the electrode had portions flooded with end product thereby preventing occurrence of the reaction.

While the problem of excess water is more pronounced in the operation of this type of fuel cell, it is also essential that the amount of water present is neither too great nor too small so that the concentration of the electrolyte, such as potassium hydroxide, remains within certain limits. For example, as water is formed in the electrode, part of it mixes with the electrolyte and dilutes the concentration of electrolyte. It has been found that this concentration directly affects the output of the cell and must remain within certain limits if the fuel cell is to operate. That is, the fuel cell will cease operating if the concentration becomes too high (too much water has been removed) or if the concentration becomes too low (not enough water has been removed).

For efficient operation, it is necessary to control the amount of water removed from the cell and to accomplish this evenly across the entire electrode surface. With this invention, this is accomplished by introducing and distributing hydrogen (or other fuel fluid) at a controlled humidity evenly along the length of the distribution grooves and passing it through the electrode in discrete flow paths evenly distributed throughout the electrode. By selecting the relative humidity of the incoming hydrogen in accordance with the practices known in the art, the electrolyte concentration can be readily controlled throughout the electrode to maintain the entire electrode in an operating condition. The most difficult problem, that of equal concentration throughout the fuel cell, is solved.

In accordance with this invention, a means for isolating the grooves or recesses from the electrode, such as a thin partition of foil, is used. The foil is interposed between the grooves and the electrode and has a means for conducting reactive fluid to the electrode in discrete segments of a plurality of evenly distributed places on the electrode. This means may be a series of perforations or holes communicating between the electrode and the distribution recesses or grooves formed by the electrode holder. The holes are evenly distributed along the length of the grooves, and therefore, across the surface, to assure even distribution of the reactive fluid. The fuel fluid flows along the groove and does not contact the electrode except in small discrete segments at the holes. The fuel fluid that contacts the electrode at the holes does not re-enter the distribution grooves but flows into and through the electrode to the collection grooves. A preferred embodiment has the thin partition or foil also located between the collection grooves and the electrode. A plurality of small holes located to communicate between the electrode and the collection grooves are also evenly distributed along the collection grooves. The flow paths are created to pass collectively through the entire electrode.

The primary advantage is that the reactive fluid does not pick up any end product in the chamber, since any reactive fluid that enters the electrode from the distribution grooves does not return to the distribution grooves. The reactive fluid in the collection grooves has accumulated a significant amount of end product but because of the foil the fluid and end product does not contact the electrode after it flows out of the holes to the collection grooves and, therefore, does not flood out the electrode or dilute the electrolyte beyond desirable limits.

The objects of this invention are: to provide a new and improved fuel cell; to provide a new and improved means for supplying reactive fluid to the electrodes of a fuel cell; to provide a means for supplying reactive fluid to an electrode of a fuel cell at a constant humidity across the entire electrode; to provide a means for regulating the amount of reaction end product in the electrode; to maintain the electrolyte concentration within operable limits; to maintain continuous operation of a fuel cell by controlling the electrolyte concentration; to control the amount of end product present in the fuel fluid; to provide a fuel cell with an increased effective operating output; to provide fuel fluid to the fuel cell in a state relatively free from contamination by any end product already present in the electrode; to reduce the accumulation of the end product in the electrode; and to segregate the fuel fluid flow into three separate portions, entering the electrode, within the electrode, and exhausting from the electrode.

Other objects and advantages will be apparent from the following description.

Figure 1:
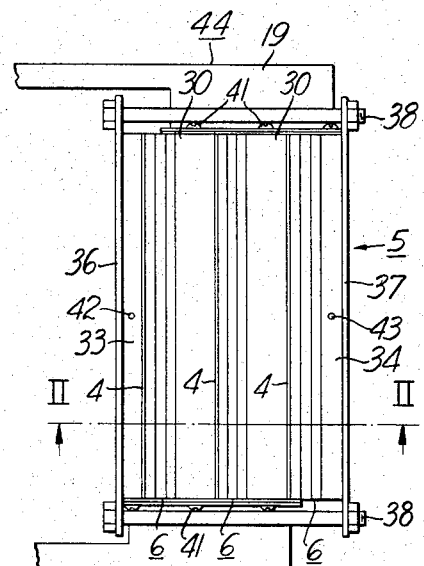
FIG. 1 is a top view of a fuel cell battery embodying this invention.

The type of fuel cell that would most advantageously adopt the type of construction that flows the reactive fluid through the electrode is generally of the type shown in the drawings. That is, a fuel cell that distributes fuel fluid against the surface of its electrodes with only a portion of the fuel fluid being consumed and the remainder passed out of the fuel cell. A common example of this type of fuel cell is called a hydrox cell.

Figure 2:
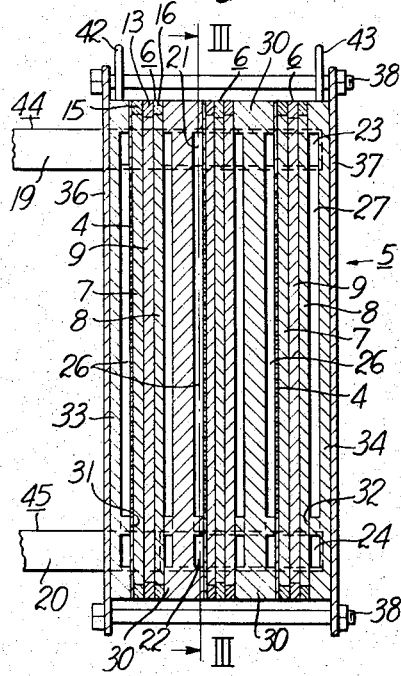
FIG. 2 is a cross sectional view of the fuel cell battery of FIG. 1 taken along lines II—II of FIG. 1.

In FIGS. 1 and 2, a fuel cell battery 5 embodying this invention has a number of fuel cell units 6 connected in series and held together by end plates 36 and 37 and fastening bolts 38. These end plates compress the fuel cell battery to maintain fluid tight chambers to contain the reactive fluids and electrolyte solution. Fluids introduced into the fuel cell are the reactive fluids, i.e., a fuel fluid and oxidizing fluid. These fluids may be any appropriate liquids and gases. A typical fuel fluid, hydrogen, and a typical oxidizing fluid, oxygen, will be used to describe the drawn embodiment of the invention.

Referring to the figures a fuel fluid distribution means is provided for delivering hydrogen into the fuel cell battery, flowing it through fuel electrodes 7, and exhausting it from the fuel cell. The fuel fluid distribution means comprises a fuel inlet means 10 that delivers hydrogen to fuel distribution grooves 26 to contact the electrode, a fuel outlet means 11 that receives the hydrogen from fuel collection grooves 28 and exhausts it out of the fuel cell, and means for forcing hydrogen through the electrode from the distribution grooves to the collection grooves. This last means may be any means, that may include a pump (not shown), that furnishes hydrogen to fuel inlet means 10 at a sufficient positive pressure relative to fuel outlet means 11.

Fuel inlet means 10 comprises a fuel inlet manifold 17 and a fuel inlet conduit 21. Fuel outlet means 11 comprises a fuel outlet conduit 22 and a fuel outlet manifold 18. The inlet and outlet means may be of any known construction or form to meet application or design requirements.

The oxygen is passed through the fuel cell by an oxidizing fluid distribution means which functions in the same manner, and with comparable means, as the fuel fluid distribution means. The oxidizing fluid distribution means comprises an oxidizing fluid inlet means 44, an oxidizing fluid outlet means 45 and a means for forcing the oxygen through the electrode. This last means may be any means that furnishes oxygen under sufficient pressure to inlet means 44. Inlet means 44 comprises an oxidizing fluid inlet manifold 19 and an oxidizing fluid inlet conduit 23 that delivers oxygen to oxidizing fluid distribution grooves 27. Outlet means 45 comprises an oxidizing fluid outlet conduit 24 and an oxidizing fluid outlet manifold 20. Outlet means 45 receives oxygen that has passed through the electrode from the oxidizing fluid collection grooves (not shown).

The manifolds shown are connected to the fuel cell battery by nonconducting manifold mounting screws 41 which tightly compress a manifold sealing gasket 40 against the side of the fuel cell battery to form fluid tight manifolds. All the manifolds are shown constructed externally from the main body of the fuel cell battery but they could be of any known form in the art. For example, they could be formed and located within the structure as channels forming internal manifolds.

More particularly, looking at FIGS. 1 and 2, each fuel cell unit 6 comprises fuel electrode 7 enclosed by a gasket 15; an oxygen electrode 8 enclosed by a gasket 16; part of two fluid distribution members which may be either unipolar fluid distribution members 33 or 34 or bipolar fluid distribution members 30; and an electrolyte portion 9 containing an electrolyte solution impregnated in a permeable membrane. A gasket 13 insulates one electrode from the other and helps prevent the electrolyte portion from drying out. Means could be provided for replenishing the electrolyte solution if such is expedient or necessary. The electrodes are relatively thin platelike structures having a generally constant porosity which allows the reactive fluid and electrolyte to permeate into the electrode to contact each other. The term "oxygen electrode" is used to indicate the electrode receiving the oxidizing fluid and is not intended to be limited to the use of oxygen.

Each fluid distribution member 30, 33, or 34 is positioned and appropriately recessed with separate groups of grooves, distribution grooves and collection grooves, to form part of the respective fluid distribution means.

Each bipolar fluid distribution member and unipolar distribution member 33 has a fuel surface 31 which would abut the electrode except for a perforated foil 4 interposed between the fuel electrode and the fluid distribution member to isolate the electrode from the member and grooves. Each bipolar fluid distribution member and unipolar distribution member 34 has an oxygen surface 32 which abuts the oxygen electrode. Fuel distribution grooves 26 and fuel collection grooves 28 are formed contiguous perforated foil 4 by the fuel surface. The perforated foil has holes 12 communicating between distribution grooves 26 and the electrode and holes 14 communicating between collection grooves 28 and the electrode. The holes are located at a plurality of places to adequately assure even distribution of the fluid across the entire electrode. Distribution grooves 27 and oxidizing fluid collection grooves (not shown) are formed contiguous oxygen electrode 8 by oxygen surface 32.

At each end of the row of fuel cell units unipolar fluid distribution members 33 and 34 are used. These members are similar to bipolar distribution members 30 except that they distribute and receive fluid only on one side, to and from one electrode. In the embodiment shown, all the fluid distribution members and the perforated foils are electrically conductive so that a series connection can be made across all the cells. The unipolar distribution members 33 and 34 have a connector 42 and a connector 43, respectively, for delivering current produced to an external circuit.

The flow path of the fuel fluid is from a fuel fluid source (not shown) and through inlet means 10 to holes 12. From each of holes 12 (communicating with the distribution grooves) the hydrogen flows through the electrode to the nearest holes 14 in the section of the foil communicating with the collection grooves so that there will be sectional flow paths through the electrode with portions of fuel fluid flowing through discrete portions of the electrode. These portions of the electrode, therefore, form part of the flow path of the fluid. The fluid passes through holes 14 into collection grooves 28 from where it is exhausted from the fuel cell by fuel outlet means 11. As the hydrogen is forced to flow through the electrode from the distribution grooves to the collection grooves, chemical reactions occur in the electrode within the flow path. The excess water formed within the flow path is carried out of and forced through the electrode by the excess flowing hydrogen. Since water is consumed at the oxygen electrode some water must be allowed to remain in the cell to maintain the desired electrolyte concentration.

While the actual configuration and placement of the grooves is not unduly critical, the distribution and collection grooves preferably are alternately juxtaposed to each other, as shown. The distribution grooves are located across the entire surface so that the appropriate reactive fluid is distributed evenly over the electrode. The distance between a distribution groove and the nearest collection groove is preferably kept at a minimum so that the resistance to flow does not become too great. Also the ratio of recessed surface to surface in contact with the electrode and the area of the openings in the foil must be balanced so that the water formed by the chemical reaction is not a large enough quantity, in any particular flow path, to prevent control of the removal of the end product by the volume of flowing reactive fluid available.

Figure 3:
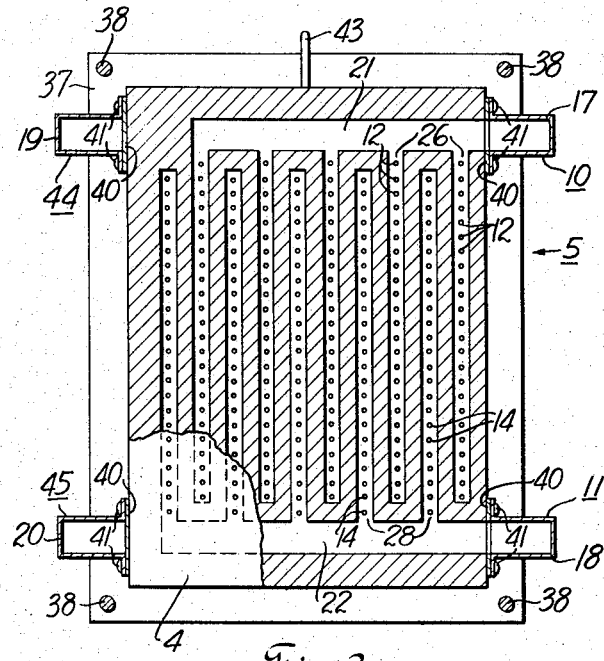
FIG. 3 is a similar cross sectional view with a portion cut away to clearly show the foil and grooves taken along lines III—III of FIG. 2.

FIG. 3 shows the preferable configuration of grooves in the fluid distribution member fuel surface and placement of the perforations or holes in foil 4. The size of the perforations can be determined empirically for different fuel fluids. For hydrogen, holes of the order of $\frac{1}{32}$ inch to $\frac{1}{16}$ inch have been found to be effective. With holes of this size the effectiveness of the fuel cell has been continuously maintained at a high level, the hydrogen has a low relative humidity at the far end of the grooves, and the fuel electrodes are prevented from being saturated with an accumulation of water.

Although the foil is shown covering both the distribution grooves and collection grooves, it is not essential that it cover the collection grooves. The foil could be cut to fully expose the collection grooves to the electrode or foil could be placed over the electrode section next to the distribution grooves. However, the objects of this invention are generally more efficiently accomplished with the embodiments shown.

While perforated foil 4 is shown only on the fuel fluid side of the fuel cell, it is evident that it may be used on the oxidizing fluid side if advisable. This need could arise where the oxidizing fluid has a significant quantity of unusable substances present that would act in a manner similar to that of the end product at the fuel electrode or where humidity control is necessary at the oxygen electrode.

The drawings utilized to describe the invention are for the purposes of clearly and accurately describing an embodiment of the invention. In actual operation, many different forms of a similar type fuel cell may be utilized in applying this invention without departing from its spirit and scope.

The embodiments in which an exclusive property or privilege is claimed are defined as follows:

1. A fuel cell comprising a fluid permeable electrode; a fluid distribution member having distribution and collection grooves in a face of the member in contact with the electrode; means interposed between the electrode and the member for isolating the electrode from the distribution grooves, said means comprising means for conducting reactive fluid from the distribution grooves to the electrode in relatively small discrete sectional flow paths at a plurality of selected places on the electrode, means for supplying fresh reactive fluid to the distribution grooves; and means for receiving spent reactive fluid from the collection grooves.

2. A fuel cell according to claim 1 wherein said means for isolating also isolates the electrode from the collection grooves and comprises means for conducting reactive fluid from the electrode to the collection grooves in relatively small discrete sectional flow paths after the reactive fluid has passed through the electrode.

3. A fuel cell comprising a fluid permeable electrode; a fluid distribution member having a surface abutting and in contact with the electrode, said surface having a distribution groove and a collection groove separated from said distribution groove with both of said grooves contiguous the electrode; means interposed between the distribution groove and the electrode for isolating the distribution groove from the electrode, said means having a plurality of relatively small holes spaced in a selected pattern along said distribution groove communicating between said electrode and said distribution groove; an inlet means for delivering fresh reactive fluid to the distribution groove; and an outlet means for receiving spent reactive fluid from the collection groove.

4. A fuel cell of the type producing water as a reaction end product comprising a fluid permeable electrode; a fluid distribution member having a surface abutting and in contact with the electrode, said surface having a distribution groove and a collection groove separated from said distribution groove with both of said grooves contiguous the electrode; means interposed between the surface and the electrode for isolating the distribution grooves from the electrode, said means having a plurality of relatively small holes spaced in a selected pattern along said distribution groove and a plurality of relatively small holes spaced in a selected pattern along said collection groove; an inlet means for delivering fresh reactive fluid to the distribution groove; and an outlet means for receiving spent reactive fluid from the collection groove.

5. A fuel cell comprising a fluid permeable electrode; a fluid distribution member having a surface abutting and in contact with the electrode, said surface having a distribution recess contiguous the electrode and a collection recess contiguous the electrode; and a thin partition between the surface and the electrode with said partition having selectively placed relatively small perforations between said electrode and at least one of the recesses.

6. A fuel cell battery comprising electrolyte portions; fluid permeable electrodes; bipolar fluid distribution members each having a surface abutting and in contact with an electrode, said surfaces each having a plurality of distribution grooves contiguous the electrode and a plurality of collection grooves contiguous the electrode; an inlet means for delivering fresh reactive fluid under pressure to the distribution grooves; and an outlet means for receiving spent reactive fluid from the collection grooves: a foil having relatively small perforations selectively placed between at least one set of grooves and said electrode, said foil interposed between each fluid distribution member surface and its abutting electrode.

7. In a fuel cell battery of the type producing water as a reaction end product and having electrolyte portions; fluid permeable electrodes; electrically conductive bipolar fluid distribution members each having a surface abutting and in contact with an electrode, said surfaces each having a plurality of distribution grooves contiguous the electrode and a plurality of collection grooves contiguous the electrode; an inlet means for delivering fresh reactive fluid under pressure to the distribution grooves; and an outlet means for receiving spent reactive fluid from the collection grooves: an electrically conductive foil interposed between each fluid distribution member surface and its abutting electrode, said foil having a plurality of relatively small holes selectively placed along the length of each groove, said holes communicating between the electrode and each respective groove.

8. A fuel cell battery of the hydrox type comprising electrolyte portions; fluid permeable fuel electrodes each adjacent one side of each electrolyte portion; fluid permeable oxygen electrodes each adjacent the other side of each electrolyte portion; electrically conductive bipolar fluid distribution members, each of said distribution members having a surface abutting and in contact with a fuel electrode and a surface abutting and in contact with an oxygen electrode, said surfaces each having a plurality of distribution grooves contiguous the abutting electrode and a plurality of collection grooves contiguous the abutting electrode, and said distribution grooves alternately juxtaposed with said collection grooves; fuel inlet means connecting the distribution grooves contiguous the fuel electrodes for receiving fresh fuel fluid at a positive pressure; oxidizing fluid inlet means connecting the distribution grooves contiguous the oxygen electrodes for receiving fuel fluid at a positive pressure; fuel outlet means connecting the collection grooves contiguous the fuel electrodes; oxidizing fluid outlet means connecting the collection grooves contiguous the oxygen electrodes; and an electrically conductive foil interposed between the electrode and the surface abutting the fuel electrode, said foil having a plurality of relatively small selectively placed holes communicating between the fuel electrode and the distribution grooves and a plurality of relatively small selectively placed holes communicating between the fuel electrode and the collection grooves.

References Cited
UNITED STATES PATENTS

| | | | |
|---|---|---|---|
| 409,366 | 8/1889 | Mond et al. | 136—86 |
| 2,070,612 | 2/1937 | Niederreither | 136—86 |
| 2,969,315 | 1/1961 | Bacon | 136—86 X |
| 2,980,749 | 4/1961 | Broers | 136—86 |
| 3,101,285 | 9/1963 | Tantram et al. | 136—86 X |
| 3,161,546 | 12/1964 | Yeager et al. | 136—86 |

ALLEN B. CURTIS, *Primary Examiner.*

WINSTON A. DOUGLAS, *Examiner.*